United States Patent [19]
Kato et al.

[11] 3,851,954
[45] Dec. 3, 1974

[54] OPHTHALMOSCOPIC CAMERA
[75] Inventors: Naoomi Kato, Yokohama; Morio Tao, Kamakura, both of Japan
[73] Assignee: Nippon Kogaku K.K., Tokyo, Japan
[22] Filed: Dec. 18, 1972
[21] Appl. No.: 315,841

[30] Foreign Application Priority Data
Dec. 25, 1971 Japan.............................. 47-2147

[52] U.S. Cl..................................... 351/7, 354/62
[51] Int. Cl............................................. A61b 3/14
[58] Field of Search ......... 351/7; 95/11 EM; 354/62

[56] References Cited
UNITED STATES PATENTS
3,594,071 7/1971 Okajima................................ 351/7

*Primary Examiner*—Paul A. Sacher
*Attorney, Agent, or Firm*—Fitzpatrick, Cella, Harper & Scinto

[57] ABSTRACT
An ophthalmoscopic camera capable of preventing unfavorable reflection of light on the corneal surface of an eye under examination, and on the front and rear surfaces of the crystalline lens even for an angle of view as wide as the order of 45°. The camera comprises a photographic optical system including an objective lens, an illuminating optical system including a light source, first and second condenser lenses, a mirror disposed at the intersection between the optical axes of the two optical systems and having an aperture for passing the image-forming light rays reflected from the fundus of an eye. A ring-shaped aperture substantially conjugate with the cornea with respect to the objective lens is provided in the illuminating optical system, and a center obscuring stop substantially conjugate with the median point between the front and rear surfaces of the crystalline lens with respect to the objective lens is also provided in the illuminating optical systems. An aperture stop is provided which is substantially conjugate with the median point between a formed image of the ring-shaped aperture and a formed image of the center obscuring stop with respect to the objective lens of the photographic system.

4 Claims, 5 Drawing Figures

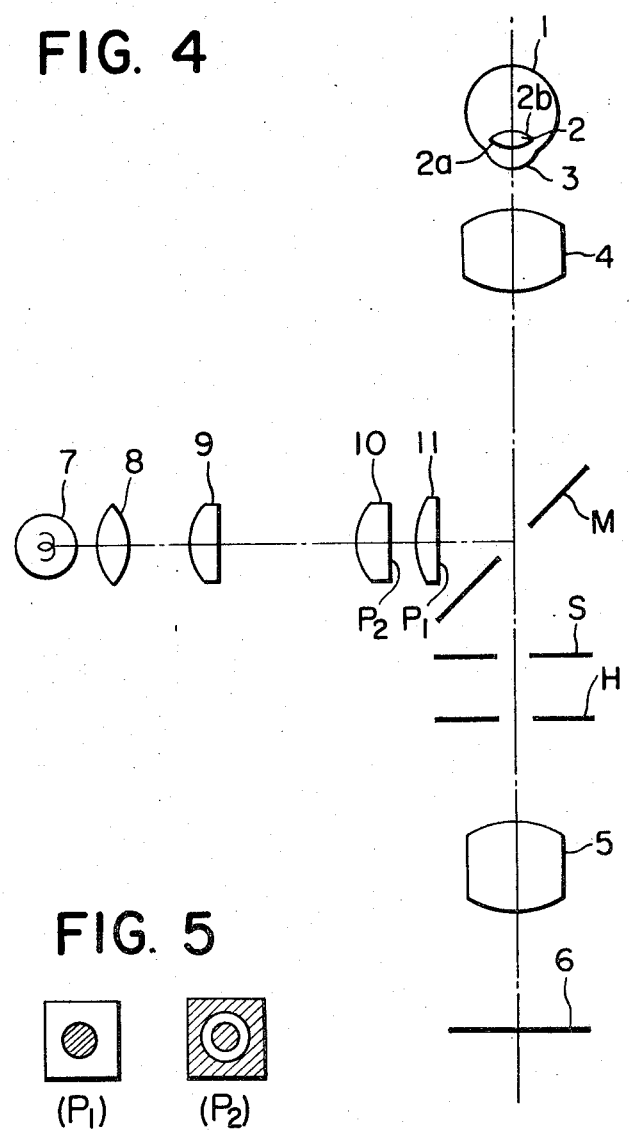
FIG. 4
FIG. 5
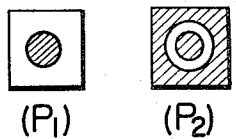

OPHTHALMOSCOPIC CAMERA

BACKGROUND OF THE INVENTION

1. Field of the Invention

This invention relates to ophthalmoscopic cameras, and more particularly to an illuminating system for such cameras.

2. Description of the Prior Art

In an ophthalmoscopic camera of the type in which part of a photographic optical system is also used as part of an illuminating optical system, the illuminating light may be reflected by the optical components and/or the cornea of an eye to be examined; and such reflected light may enter into the photographic optical system. This causes flare, ghosts, or like phenomenon which prevent a definitive picture of the eye fundus from being obtained.

Various methods of eliminating the aforesaid unfavorable reflected light have been attempted, one of these methods being known as the ring illumination method which prevents the reflection of light on the cornea of the eye to be examined.

Another known method is to prevent the unfavorable reflection of light from the surface of an objective lens in the photographic optical system by forming a black spot in the illuminating optical system.

However, any of these known methods is effective only when the photographic angle of view (i.e., the range within which definite pictures can be provided) is very small, that is of the order of 30°. For a wider angle, e.g., 45°, illuminating light may be reflected not only by the objective lens and/or the corneal surface but also by the surfaces (front and rear) of the crystalline lens in the eye to be examined to provide unfavorable reflected light.

SUMMARY OF THE INVENTION

It is the object of the present invention to provide an ophthalmoscopic camera which can prevent the unfavorable reflection of light on the cornea surface and on the front and rear surfaces of the crystalline lens even for an angle of view as wide as the order of 45°, thus to produce a definitive picture of an eye fundus.

According to the present invention, the ophthalmoscopic camera comprises a photographic optical system including an objective lens for forming an image of the fundus of an eye, an illuminating optical system for illuminating the fundus of the eye including a light source, first and second condenser lenses, and a mirror disposed at the intersection between the two optical axes of the photographic and illuminating optical systems for directing the light rays from the light source into the fundus of the eye through the objective lens. The mirror has an aperture for passing therethrough the image-forming light rays reflected from the fundus of the eye. A ring-shaped aperture is provided on a surface of the first condenser lens and substantially conjugate with a cornea of the eye with respect to the objective lens for preventing the light rays reflected by the cornea surface from entering into the path of the image-forming rays. A center obscuring stop is provided on a surface of the second condenser lens and substantially conjugate with the median point between the front and rear surfaces of a crystalline lens of the eye with respect to the objective lens for preventing the light rays reflected by the front and rear surfaces of the crystalline lens from entering into the path of the image-forming light rays. An aperture stop for passing therethrough only the image-forming light rays passed through the aperture of the mirror is provided substantially conjugate with the median point between an image of the ring-shaped aperture and an image of the center obscuring stop formed by the objective lens with respect to the objective lens.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 4 is a schematic view showing an embodiment of the optical arrangement in the device of the present invention; and FIG. 5 shows a form of black spots disposed in the optical arrangement.

DESCRIPTION OF THE PREFERRED EMBODIMENTS

Figure 1:
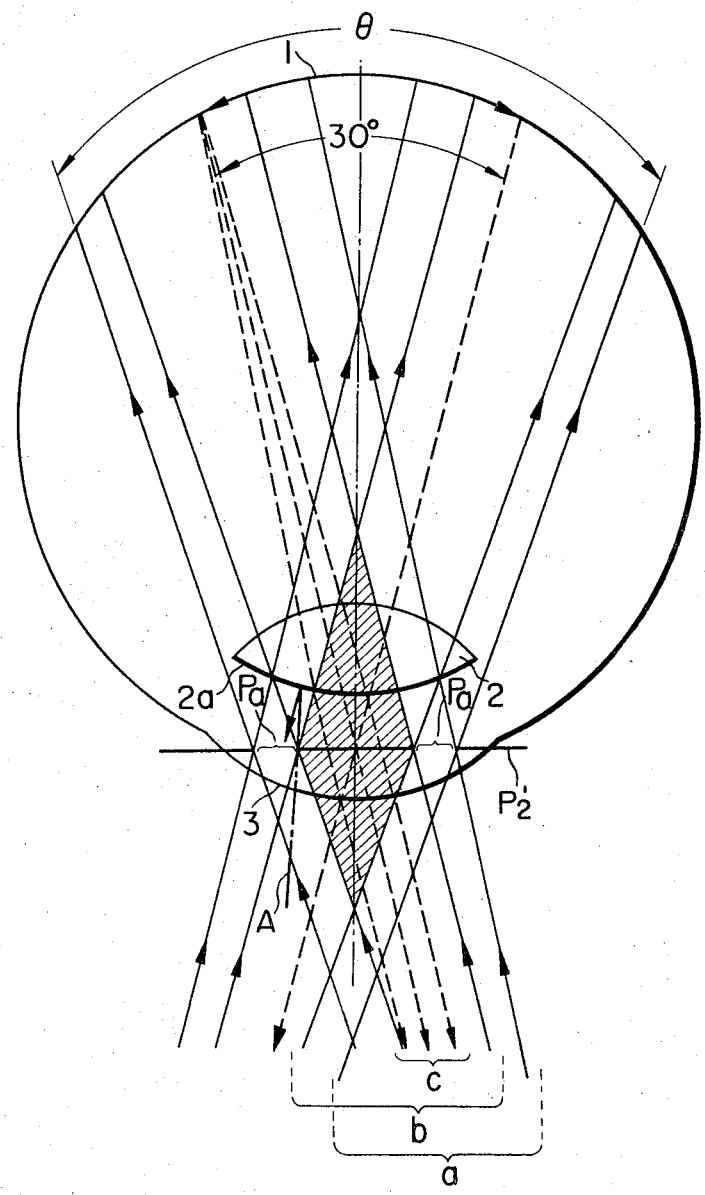
FIGS. 1, 2 and 3 are schematic views illustrating are eye under examination by a device of the class described.
Figure 2:
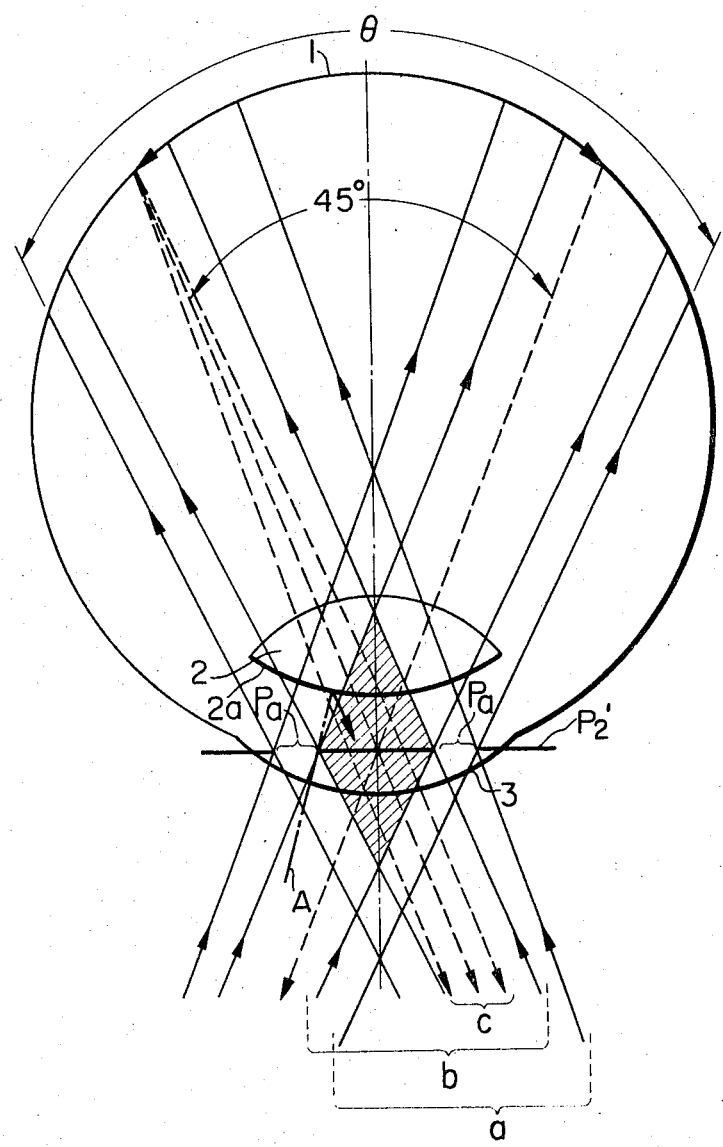

With reference to FIGS. 1 and 2, description will first be made of how and why the aforesaid unfavorable reflection of light occurs on the front surface of the crystalline lens, for example.

In FIG. 1, numeral 1 designates the fundus of an eye to be examined, 2 a crystalline lens, 2a the front surface of the crystalline lens, and 3 the surface of a cornea. P2' is a projected image of a ring-shaped aperture (P2 in FIG. 5) formed to prevent the unfavorable reflection of light rays on the cornea surface within a conventional angle of view (30°). Pa is a projected image of the opening portion of the ring-shaped aperture P2, i.e. the portion which permits passage of illuminating light therethrough. Letters $a$ and $b$ represent maximum beams of illuminating light which can pass through the projected image Pa of the opening portion of the ring-shaped aperture. Letter $c$ represents a maximum beam of image-forming light coming over the full angle of view, and $\theta$ represents the maximum range illuminated by the illuminating light. All of the foregoing is also true of FIG. 2.

When the photographic angle of view is 30°, as was conventional, it can be seen in FIG. 1 that a region free of illuminating light (i.e. the hatched portion) is formed to extend forwardly and rearwardly of the image P2' of the ring-shaped aperture projected substantially on the corneal surface.

When a beam of illuminating light passes through the corneal surface 3 and through the front surface 2a of the crystalline lens 2, a problem is encountered in that such illuminating light is reflected by these surfaces to provide unfavorable reflected light. As shown, the illuminating light does not come to the hatched portion but the image-forming light beam c passes through the hatched portion. Therefore, even if the illuminating light is reflected by the front surface 2a of the crystalline lens as indicated by a beam A in FIG. 1, such beam A will not enter into the image-forming light beam c but will travel outwardly with respect to the image-forming light beam, thus providing no unfavorable reflected light which would result in flare, ghosts, or the like. However, the aforesaid light beam A is an unfavorable reflected light which may cause halation or the like; this light beam can be totally interrupted by a circular aperture stop (H in FIG. 4) which will later be described.

$\theta$ is the maximum range of illumination determined by such factors as the projected image P2' of the ring-shaped aperture P2 and objective lens, designated by numeral 4 in FIG. 4. Of course, the illuminating light is reflected by the fundus 1 of the eye to provide an image-forming light beam, whose width may be restricted by the circular aperture stop H (FIG. 4).

If the photographic angle of view is wider than the conventional one, e.g., of the order of 45° as in the case of the present invention, then the illuminating light beam will pass through the projected image Pa of the ringshaped aperture at a correspondingly greater angle than the previous case, as is shown in FIG. 2, so that the hatched portion in FIG. 2 will differ from that in FIG. 1. More specifically, the area over which the hatched portion of FIG. 2 covers the front surface 2a of the crystalline lens is smaller than the area over which the hatched portion of FIG. 1 covers the front surface 2a of the crystalline lens. As a result, part of the image-forming light beam c passed through the front surface 2a of the crystalline lens protrudes outwardly of the hatched portion as shown in FIG. 2, so that some of the illuminating light is reflected by the crystalline lens front surface 2a as indicated by the light beam A, thus entering into the image-forming light beam. Such reflected light is an unfavorable one which may cause flare, ghosts, or the like.

As the means for preventing such unfavorable reflected light, it would occur to those skilled in the art to enlarge the projected image P2' thereby to enlarge the hatched portion, but this would reduce the amount of illuminating light to such an extent as to cause insufficient illumination. This in turn would introduce difficulties in picture-taking and as indicated, the conventional means could hardly prevent the unfavorable reflected light induced by the crystalline lens front surface 2a.

Figure 3:
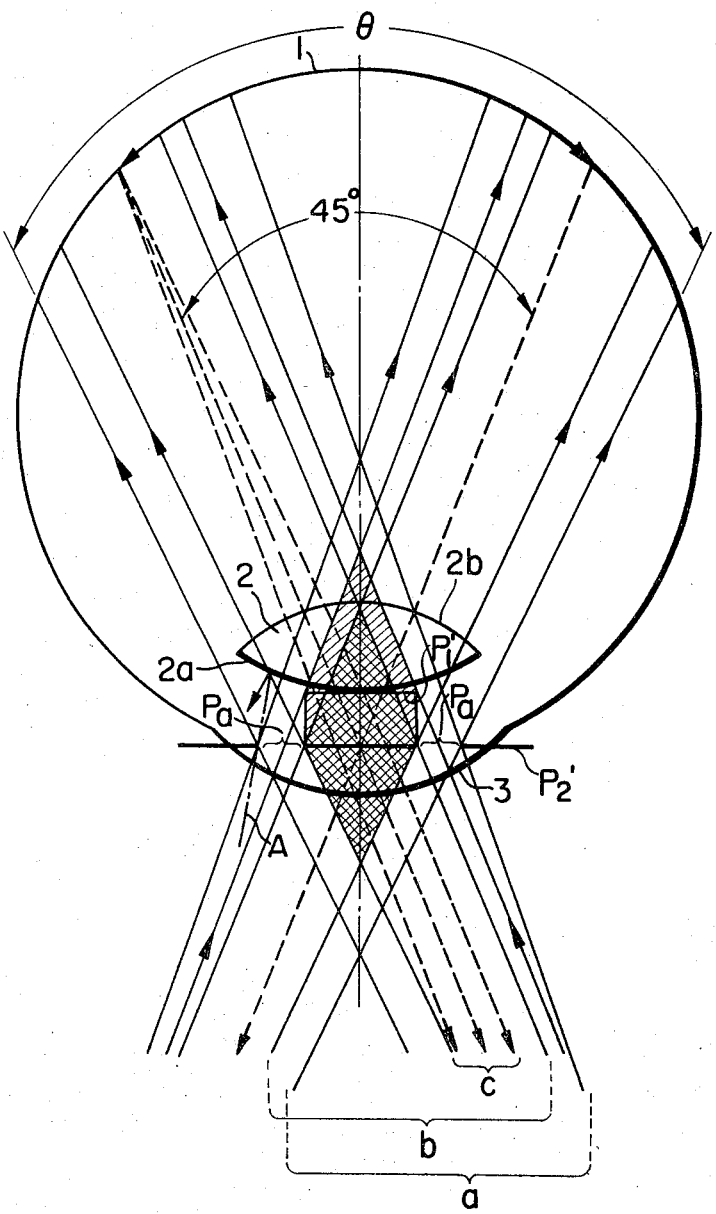

Referring to FIG. 3 there is shown an eye under examination by an embodiment of the present invention, as illustrated in FIG. 4, which prevents reflection of light on the corneal surface 3 and on the front surface 2a of the crystalline lens 2, but not on the rear surface 2b of the crystalline lens.

In FIG. 4, numeral 1 designates the fundus of an eye to be examined, 2 the crystalline lens in the eye, 2a and 2b the front and rear surfaces of the crystalline lens, respectively, and 3 the corneal surface. Objective lenses 4 and 5 are disposed in alignment with each other and with the eye. Disposed between the objective lenses 4 and 5 is a plane mirror M having an aperture formed centrally thereof and dimensioned to pass a beam of image-forming light therethrough. Circular aperture stops S and H are further disposed between the mirror M and the objective lens 5. These elements together constitute a photographic optical system in connection with which a film 6 is shown positioned behind the lens 5.

Along an axis perpendicularly intersecting the optical axis of the photographic optical system, and passing through the center of the mirror M, there are disposed an illuminating light source 7 and condenser lenses 8, 9, 10 and 11. The condenser lenses 10 and 11 are formed with a black spot P1 and a ring-shaped aperture P2, respectively, as shown in FIG. 5. The black spot P1 is located at a position substantially conjugate with the front surface 2a of the crystalline lens 2 with respect to the objective lens 4, and the size of the black spot P1 is selected such that, as shown in FIG. 3, all the image-forming light beam is contained in that portion of the front surface 2a of the crystalline lens which is within a hatched portion extending forwardly and rearwardly of the projected image P1' of the black spot P1 (the hatched portion represents the region which is free from the illuminating light). The ring-shaped aperture P2 is located at a position substantially conjugate with the corneal surface 3 with respect to the objective lens 4. The size of the black spot within the aperture P2 is selected such that, as shown in FIG. 3, all the image-forming light beam is contained in that portion of the corneal surface 3 which is within a hatched portion extending forwardly and rearwardly of the projected image P2' of the aperture P2 (the latter hatched portion represents the region which is free from the illuminating light). The foregoing elements 7 to 11 constitute an illuminating optical system. It is to be understood that $\theta$ in FIG. 3 represents the maximum range over which the fundus 1 of the eye to be examined is illuminated by the illuminating optical system.

In operation, the illuminating light from the light source 7 passes through the successive condenser lenses 8, 9, 10 and 11. As it passes through the condenser lens 10, the amount of such light is restricted to a certain extent by the ring-shaped aperture P2, and the light is reflected by the mirror M toward the eye to be examined and further passed through the objective lens 4 to the corneal surface 3, thus forming the projected image P2' of the ring-shaped aperture P2 on the corneal surface 3. The region which is free from the illuminating light (i.e., the hatched portion) extends forwardly and rearwardly of the corneal surface 3, and the image-forming light beam c passes through such hatched portion and is not reflected by the corneal surface 3, so that the image-forming light beam c is prevented from providing any unfavorable reflected light which would cause flare, ghosts or the like. At the same time, the illuminating light is restricted by the black spot p1 located on the optical axis of the illuminating optical system at a position conjugate with the front surface 2a of the crystalline lens 2 with respect to the objective lens 4, so that the black spot P1 is projected as a black spot image P1' (FIG. 3) on the front surface 2a of the crystalline lens 2. A region which is free from the illuminating light beam (i.e., the hatched portion) extends forwardly and rearwardly of the black spot image P1', and in the front surface 2a of the crystalline lens 2, the image-forming light beam c passes through such hatched portion. Consequently, as shown in FIG. 3, the illuminating light ray A reflected from the front surface 2a of the crystalline lens 2 cannot enter into the image-forming light beam c. The image-forming light beam passes through the objective lens 4, the aperture in the plane mirror M, the circular aperture stops S and H and the objective lens 5 to the film surface 6, thus forming an image of the eye fundus thereon. The circular aperture stop S is optically in conjugate relationship with the projected black spot image P1' on the crystalline lens with respect to the objective lens 4. The unfavorable reflection of light on the front surface 2a of the crystalline lens which would cause flare, ghosts or the like may be prevented, while the halation-inducing light reflected on the front surface 2a of the crystalline lens outside the black spot image P1' may be blocked by the circular aperture stop S whose aperture is smaller than the conjugate image of the black spot image P1' with respect to the objective lens 4. Further, the circular aperture stop H is optically in conjugate relationship with the black spot image P2' formed near the corneal surface 3, with respect to the objective lens 4. Like the circular aperture stop S, the circular aperture stop H serves to block any unfavorable reflected light which would cause halation if such reflected light were produced on the corneal surface 3. For this purpose, the size of the aperture of the aperture stop S is necessarily smaller than the conjugate image of the black spot image P2' with respect to the objective lens 4.

In the above-described arrangement, it is also possible to eliminate the black spot P1 and aperture stop S by locating the aperture of the plane mirror M in optically conjugate relation with the median point between the front and rear surfaces of the crystalline lens with respect to the objective lens, thereby causing the aperture of the mirror M to provide the black spot of the illuminating optical system as well as the circular aperture stop of the photographic optical system.

The illustrated embodiment is designed to prevent occurrence of unfavorable reflected light on the corneal surface 3 and on the front surface 2a of the crystalline lens 2 which would cause flare, ghosts or the like, whereas the occurrence of unfavorable reflected light on the corneal surface 3 and the front and rear surfaces 2a, 2b of the crystalline lens may be prevented by providing the black spot P1 at a position on the optical axis of the illuminating optical system which is conjugate with the substantially median point between the front and rear surfaces 2a, 2b of the crystalline lens with respect to the objective lens 4. The size of the black spot P1 is selected such that the image-forming light beam is contained in the front and rear surfaces 2a, 2b of the crystalline lens within the portion which is free from the illuminating light (i.e., the hatched portion) extending forwardly and rearwardly of the projected image of the black spot P1.

Also, in the illustrated embodiment, two circular aperture stops S and H are provided, whereas one of them may be eliminated and the other may be disposed at a position conjugate with the substantially median point between the projected images P2' and P1' with respect to the objective lens 4.

From the foregoing description it will be seen that even when a wide angle of view, and accordindly a wide range of illumiantion, is adapted for photographing the fundus of an eye, the present invention can fully eliminate not only the cornea-reflected rays of the illuminating light, i.e., what has herein been referred to as "unfavorable reflected light," but also the occurrence of unfavorable reflected rays on the front and rear surfaces of the crystalline lens which could not be eliminated by any prior art device known to us, thus providing a highly definitive picture of the eye fundus. Moreover, the present invention permits a wider photographing range and higher definition of the resultant picture, which is very useful for the early detection of eye diseases.

We believe that the construction and operation of our novel ophthalmoscopic camera will now be understood, and that the advantages thereof will be fully appreciated by those persons skilled in the art.

What is claimed is:

1. An ophthalmoscopic camera comprising:
   a photographic optical system including an objective lens for forming an image of the fundus of an eye;

an illuminating optical system for illuminating the fundus of the eye including a light source, first and second condenser lenses;
   a mirror disposed at the intersection between the two optical axes of said photographic and illuminating optical systems for directing the light rays emanating from the light source into said fundus of the eye through said objective lens;
   said mirror having an aperture for passing therethrough the image-forming light rays reflected from the fundus of the eye;
   a ring-shaped aperture provided in said illuminating optical system and substantially conjugate with a cornea of the eye with respect to said objective lens for preventing the light rays reflected by the corneal surface from entering into the path of said image-forming rays;
   a center obscuring stop provided in said illuminating optical system and substantially conjugate with the median point between the front and rear surfaces of a crystalline lens of the eye with the respect to said objective lens for preventing the light rays reflected by the front and rear surfaces of the crystalline lens from entering into the path of the image-forming light rays; and
   an aperture stop for passing therethrough only said image-forming light rays passed through said aperture of said mirror, substantially conjugate with the median point between an image of said ring-shaped aperture and an image of said center obscuring stop formed by the objective lens with respect to said objective lens.

2. An ophthalmoscopic camera according to claim 1, wherein said ring-shaped aperture is provided on a surface of said first condenser lens.

3. An opthalmoscopic camera according to claim 1, wherein said center obscuring stop is provided on a surface of said second condenser lens.

4. An ophthalmoscopic camera comprising:
   a photographic optical system including an objective lens for forming an image of the fundus of an eye;

an illuminating optical system for illuminating the fundus of the eye including a light source, first and second condenser lenses;

a mirror disposed at the intersection between the two optical axes of said photographic and illuminating optical systems for directing the light rays emanating from the light source into said fundus of the eye through said objective lens;

said mirror having an aperture for passing therethrough the image forming light rays reflected from the fundus of the eye;

a ring-shaped aperture provided on a surface of said first condenser lens and substantially conjugate with a cornea of the eye with respect to said objective lens for preventing the light rays reflected by the cornea surface from entering into the path of said image-forming light rays;

a center obscuring stop provided on a surface of said second condenser lens and substantially conjugate with the front surface of a crystalline lens of the eye with respect to said objective lens for preventing the light rays reflected by the front surface of the crystalline lens from entering into the path of the image forming light rays;

a first aperture stop for passing therethrough only said image-forming light rays passed through the aperture of said mirror, substantially conjugate with the image of the center obscuring stop formed by the objective lens with respect to said objective lens; and a second aperture stop for passing therethrough only said image-forming light rays passed through said first aperture stop, conjugate with the image of the ring-shaped aperture formed by the objective lens with respect to said objective lens.

* * * * *